United States Patent
Kikuchi et al.

(10) Patent No.: US 8,523,296 B2
(45) Date of Patent: Sep. 3, 2013

(54) ELECTRIC DRIVE VEHICLE

(75) Inventors: Akira Kikuchi, Hitachi (JP); Takashi Ikimi, Hitachi (JP); Keizo Shimada, Hitachi (JP); Naoshi Sugawara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 187 days.

(21) Appl. No.: 11/627,388

(22) Filed: Jan. 26, 2007

(65) Prior Publication Data

US 2007/0222288 A1   Sep. 27, 2007

(30) Foreign Application Priority Data

Mar. 24, 2006   (JP) .................................. 2006-081907

(51) Int. Cl.
B60T 8/64   (2006.01)

(52) U.S. Cl.
USPC ............. 303/151; 303/191; 180/65.1; 477/27

(58) Field of Classification Search
USPC ............. 303/151, 191, 89, 152; 188/DIG. 2, 188/353; 701/70; 180/65.1, 65.2, 170; 318/430, 432, 434, 436; 903/947; 477/7, 477/9

See application file for complete search history.

(56) References Cited

U.S. PATENT DOCUMENTS

| | | | |
|---|---|---|---|
| 3,372,323 A | | 3/1968 | Guyeska |
| 4,661,757 A * | | 4/1987 | Hokari et al. ................. 318/798 |
| 4,843,297 A | | 6/1989 | Landino et al. |
| 4,928,227 A * | | 5/1990 | Burba et al. .................... 701/66 |
| 5,049,793 A * | | 9/1991 | Tanaka et al. ................. 318/436 |
| 5,150,780 A | | 9/1992 | Fischer |
| 5,341,077 A * | | 8/1994 | Chen et al. .................... 318/434 |
| 5,376,869 A | | 12/1994 | Konrad |
| 5,446,351 A | | 8/1995 | Kusano et al. |
| 5,573,312 A * | | 11/1996 | Muller et al. ..................... 303/3 |
| 5,650,700 A * | | 7/1997 | Mutoh et al. .................. 318/432 |
| 5,656,901 A * | | 8/1997 | Kurita ............................ 318/436 |
| 5,659,235 A * | | 8/1997 | Yamada et al. ............... 318/801 |
| 5,726,890 A * | | 3/1998 | Takamoto et al. .............. 701/70 |
| 6,121,740 A * | | 9/2000 | Gale et al. ..................... 318/376 |
| 6,575,257 B1 * | | 6/2003 | Ikkai et al. .................... 180/65.8 |
| 6,621,291 B2 * | | 9/2003 | Lee et al. ...................... 324/772 |

(Continued)

FOREIGN PATENT DOCUMENTS

| | | |
|---|---|---|
| JP | 58-033904 | 2/1983 |
| JP | 59-103502 | 6/1984 |

(Continued)

OTHER PUBLICATIONS

Australian Search Report, dated Jul. 14, 2008 on Appln. 2007200324.

*Primary Examiner* — Robert A Siconolfi
*Assistant Examiner* — Mariano Sy
(74) *Attorney, Agent, or Firm* — Antonelli, Terry, Stout & Kraus, LLP.

(57) ABSTRACT

An electric drive vehicle having an induction motor for braking or driving wheels, a motor controller for controlling the induction motor, and mechanical brakes for braking the wheels, wherein while the vehicle is in halt in a state that the mechanical breaks are not operating, the motor controller applies DC voltage or AC voltage in a frequency range of −1 Hz to +1 Hz to the stator of the induction motor to make the induction motor generate torque for stopping the vehicle and maintain the vehicle in a halt state.

14 Claims, 8 Drawing Sheets

(56) References Cited

U.S. PATENT DOCUMENTS

| | | | |
|---|---|---|---|
| 6,731,084 B2 * | 5/2004 | Gagnon et al. | 318/372 |
| 6,877,578 B2 * | 4/2005 | Li et al. | 180/243 |
| 6,984,954 B2 * | 1/2006 | Leonardi et al. | 318/602 |
| 7,926,889 B2 * | 4/2011 | Bell et al. | 303/191 |
| 2004/0178754 A1 | 9/2004 | Anwar et al. | |
| 2005/0206332 A1 | 9/2005 | Shimizu et al. | |
| 2006/0047400 A1 | 3/2006 | Prakash et al. | |

FOREIGN PATENT DOCUMENTS

| | | |
|---|---|---|
| JP | 61-210804 A | 9/1986 |
| JP | 2001-333587 | 11/2001 |
| JP | 2004-155581 | 6/2004 |
| JP | 2005-102396 | 4/2005 |

* cited by examiner

ELECTRIC DRIVE VEHICLE

BACKGROUND OF THE INVENTION

The present invention relates to a control system for starting an electric vehicle in halt or stopping the electric vehicle in roll, and more particularly to an electric drive vehicle capable of starting and stopping without rolling backwards on sloped road and using mechanical brakes.

Description will be made on a control system for starting an electric drive vehicle on a sloped road according to conventional techniques. When the vehicle is started on a sloped road, mechanical brakes are used to stop the vehicle on the sloped road by using torque generated by the mechanical brakes. In this state, torque is output from a motor, and when it becomes possible for the motor to output torque capable of supporting the vehicle on the sloped road so as not to make the vehicle roll backwards, the mechanical brakes are released. With this operations, the vehicle can be started even on the sloped road without rolling backwards. A vehicle conducting such operations is described, for example, in U.S. Pat. No. 6,150,780 (from line 39 in 11-th column to line 20 in 20-th column).

Hill start using mechanical brakes is, however, associated with some problems because of the following reasons. First, it is difficult to effect cooperative control between mechanical brakes and a motor. For example, the following problems occur. If mechanical brakes are released before sufficient motor torque is generated, the vehicle rolls backwards. Conversely, if mechanical brakes are released immediately after sufficient torque is generated, the vehicle starts abruptly. In order to overcome these problems, the following operations and the like are required. Mechanical brakes are released at a timing when a force applied to the vehicle by gravity balances with torque output from the motor, or mechanical brakes are gradually released. It is however difficult in reality, when considering that the conditions such as a gradient of the sloped road, a vehicle weight and an operation delay of mechanical brakes change in various ways.

Second, mechanical brakes are subject to abrasion because motor torque is increased while the mechanical brakes are operated. If mechanical brakes are released at a timing when a force applied to the vehicle by gravity balances with torque output from the motor, abrasion is small. This operation is, however, difficult in reality. A generally effected operation is therefore to release mechanical brakes when the vehicle starts to roll. In this case, the vehicle starts to roll in the state that the mechanical brakes are operated, so that the mechanical brakes are subject to abrasion. Abrasion of the mechanical brakes is desired to be as small as possible because the abrasion results in an increase in a maintenance cost.

As described above, hill start using mechanical brakes is associated with difficulties in cooperative operations between the mechanical brakes and motor and abrasion of the mechanical brakes.

SUMMARY OF THE INVENTION

It is an object of the present invention to suppress abrasion of mechanical brakes without cooperative operations between the mechanical brakes and motor.

In order to achieve the above object, the present invention provides an electric drive vehicle comprising an induction motor for braking or driving wheels, a motor controller for controlling the induction motor, and mechanical brakes for braking the wheels, wherein while the vehicle is in halt in a state that the mechanical brakes are not operating, the motor controller applies DC voltage or AC voltage in a frequency range of −1 Hz to +1 Hz to the stator of the induction motor to make the induction motor generate torque for stopping the vehicle and maintain the vehicle in a halt state.

According to the present invention, it is possible to start and stop a vehicle on a sloped road without using mechanical brakes and rolling backwards. It is therefore possible not to conduct cooperative operations between the mechanical brakes and motor when the vehicle starts and stops, and to suppress abrasion of the mechanical brakes.

Other objects, features and advantages of the invention will become apparent from the following description of the embodiments of the invention taken in conjunction with the accompanying drawings.

DESCRIPTION OF THE EMBODIMENTS

Embodiments of the present invention will now be described with reference to the accompanying drawings.

First Embodiment

Figure 1:
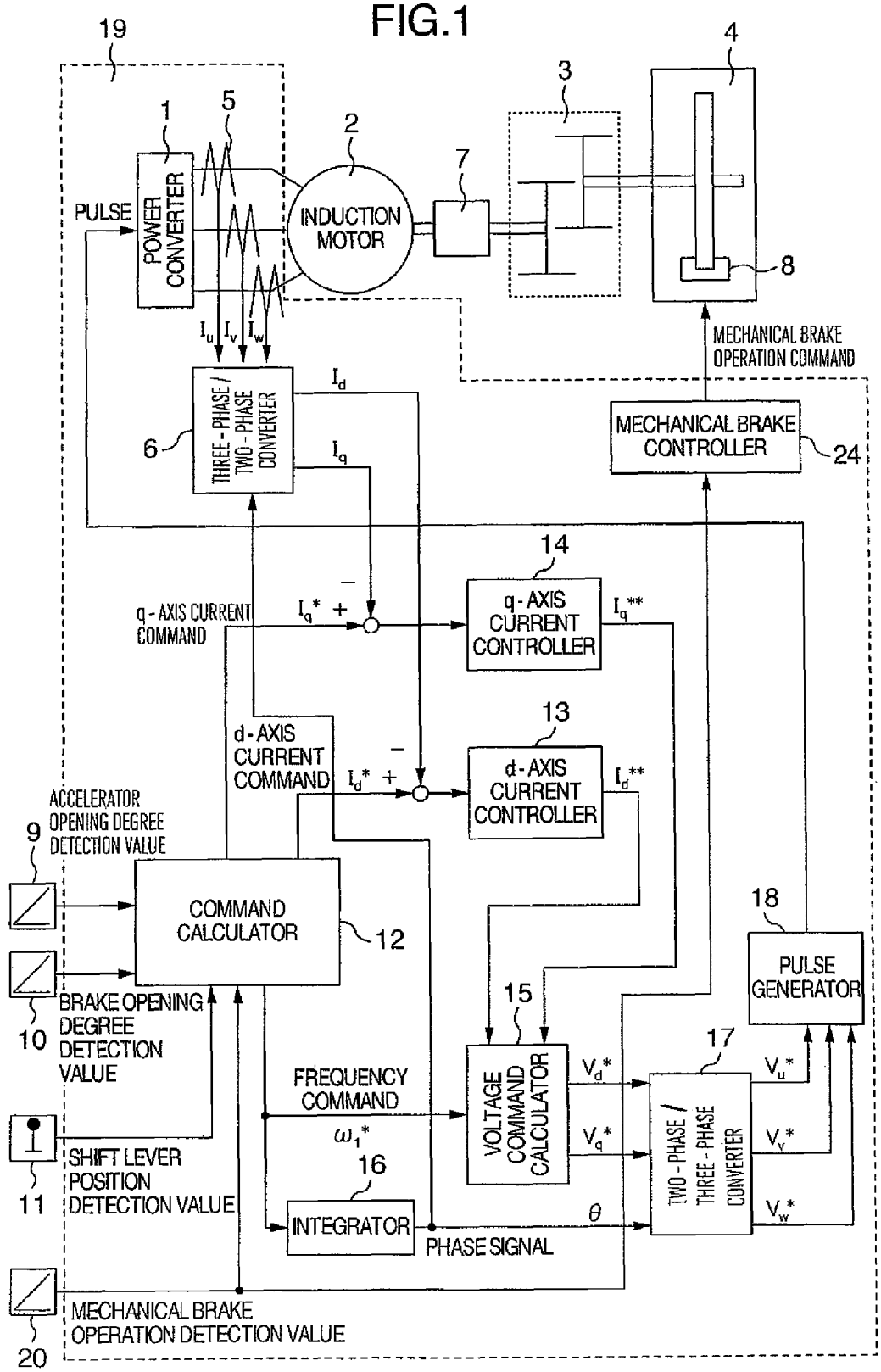
FIG. 1 is an illustrative diagram showing a control system of an electric drive vehicle according to a first embodiment.

FIG. 1 shows the overall structure of the first embodiment. Referring to FIG. 1, a vehicle rolls forwards or backwards when an induction motor 2 drives wheels 4 via gears 3. The induction motor 2 is controlled by a motor control system 19, and a power converter 1 drives the induction motor 2. Current detectors 5 are connected between the power converter 1 and induction motor 2 to detect three-phase currents $I_u$, $I_v$ and $I_w$ flowing therebetween.

A three-phase/two-phase converter 6 converts the detected three-phase current values into two-axis components, d-axis components $I_d$ and q-axis components $I_q$, by using a phase signal θ. A speed detector 7 is connected to the induction motor 2 to detect a rotation speed of the induction motor 2 and hence a running speed of the vehicle. A running speed of the vehicle to be detected may be obtained through estimation calculation without using the speed detector 7. Mechanical brakes 8 brake the wheels 4 to decelerate the vehicle.

An accelerator opening degree detector 9 detects an opening degree of an accelerator pedal depressed by an accelerator operation by a driver, and a brake opening degree detector 10 detects an opening degree of a brake pedal depressed by a brake operation by the driver. A shift lever detector 11 detects a position of a shift lever. For example, the position of the shift lever takes three positions of F, N and R. F is selected when the vehicle is made to roll forwards, and R is selected when the vehicle is made to roll backwards. When N is selected, the power converter 1 stops voltage output.

A mechanical brake operation detector 20 detects an operation of a mechanical brake pedal, and outputs a mechanical brake operation detection value. A mechanical brake controller 24 is input with the mechanical brake operation detection value output from the mechanical brake operation detector 20, and outputs a mechanical break operation command.

Receiving an accelerator opening degree detection value output from the accelerator opening degree detector 9, a brake opening degree detection value output from the brake opening degree detector 10, a shift lever position detection value output from the shift lever position detector 11 and a mechanical brake operation detection value output from the mechanical break operation detector 20, a command calculator 12 outputs a d-axis current command Id*, a q-axis current command Iq* and a frequency command ω1*. The mechanical brakes 8 regulate the wheels 4 in accordance with the mechanical brake operation command output from the mechanical brake controller 24.

A d-axis current controller 13 is input with a difference between the d-axis current command $I_d^*$ output from the command calculator 12 and the current detection value $I_d$ output from the three-phase/two-phase converter 6, and outputs a current command $I_d^{}$ which is used for voltage command calculation. For example, the d-axis current controller 13 is constituted of a proportional-integral regulator, and determines the current command $I_d^{}$ for use with voltage command calculation in such a manner that a difference between the d-axis current command $I_d^*$ and current detection value $I_d$ becomes "0".

A q-axis current controller 14 is input with a difference between the q-axis current command $I_q^*$ output from the command calculator 12 and the current detection value $I_q$ output from the three-phase/two-phase converter 6, and outputs a current command $I_q^{}$ which is used for voltage command calculation. For example, the q-axis current controller 14 is constituted of a proportional-integral regulator, and determines the current command $I_q^{}$ for use with voltage command calculation in such a manner that a difference between the q-axis current command $I_q^*$ and current detection value $I_q$ becomes "0".

Receiving the current command $I_d^{}$ output from the d-axis current controller 13, the current command $I_q^{}$ output from the q-axis current controller 14 and the frequency command $\omega_1^*$ output from the command calculator 12, a voltage command calculator 15 outputs d-axis components $V_d^*$ and q-axis components $V_q^*$ of an output voltage command. An integrator 16 integrates the frequency command $\omega_1^*$ output from the command calculator 12 to output the phase signal θ.

By using the phase signal θ output from the integrator 16, a two-phase/three-phase converter 17 converts the d-axis components $V_d^*$ and q-axis components $V_q^*$ of the output voltage command output from the voltage command calculator 15 into three-phase output voltage commands $V_u^*$, $V_v^*$ and $V_w^*$.

A pulse generator 18 outputs a gate pulse signal to the power converter 1 through pulse width modulation (PWM) in accordance with the three-phase output voltage commands $V_u^*$, $V_v^*$ and $V_w^*$ output from the two-phase/three-phase converter 17. Upon reception of the gate pulse signal, the power converter 1 performs high speed switching of power semiconductor switching elements such as IGBT to thereby output voltages corresponding to the commands.

Figure 2:
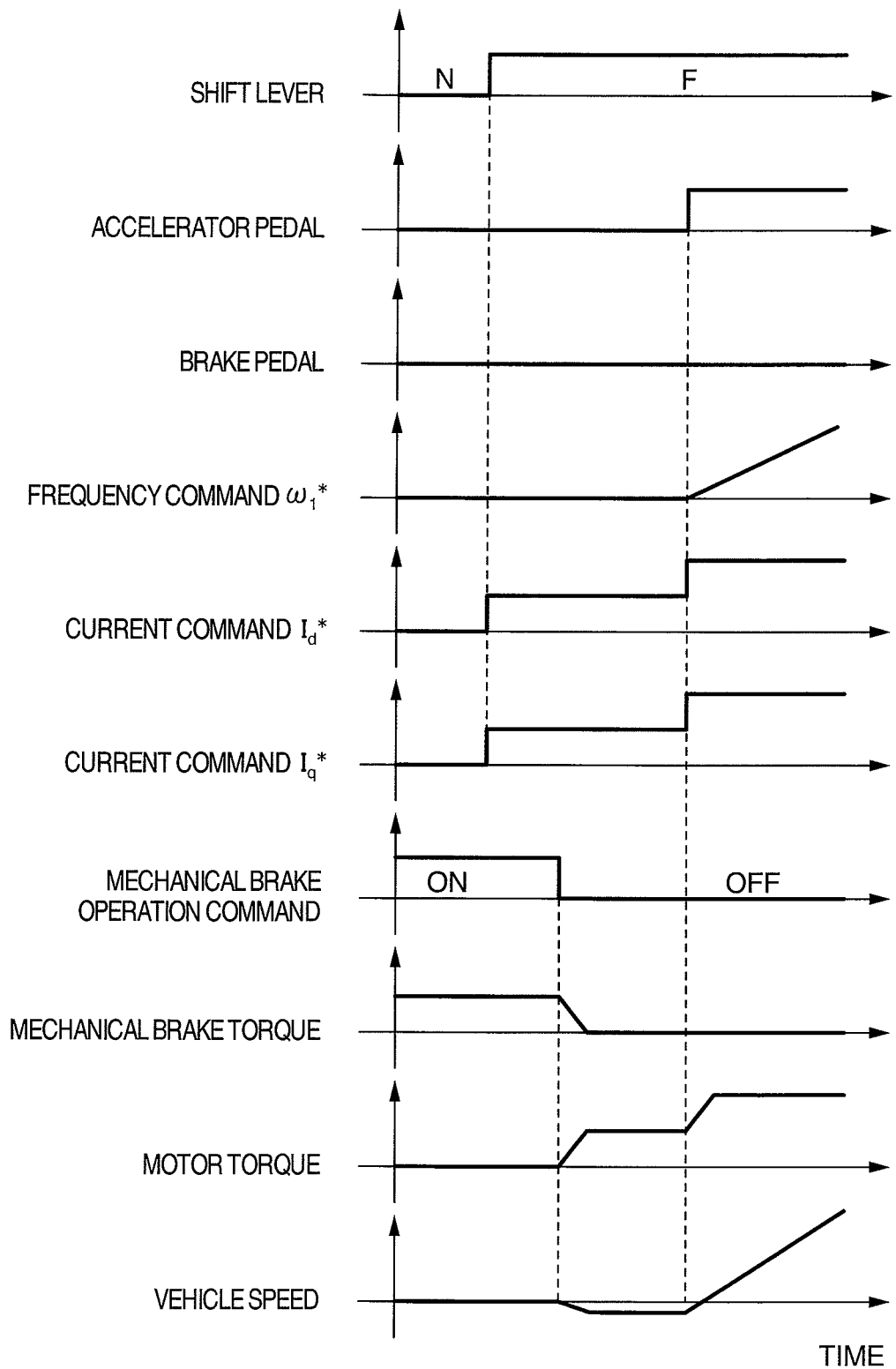
FIG. 2 is a timing chart illustrating an operation of the vehicle of the first embodiment when the vehicle in halt starts.

FIG. 2 is a timing chart illustrating an operation when the vehicle of the embodiment in halt starts. Consider now that the vehicle in halt on a sloped road starts in the state that the mechanical brakes 8 are operating and the position of the shift lever is N. Since the position of the shift lever is N, the power converter 1 stops voltage output, current will not flow through the stator of the induction motor 2, and the induction motor 2 will not generate torque. Therefore, the vehicle does not roll downwards on the sloped road because of torque generated by the mechanical brakes 8.

Next, as the position of the shift lever is changed from N to F, the command calculator 12 outputs predetermined current commands $I_d^*$ and $I_q^*$ and a frequency command $\omega_1^*$ of "0". The power converter 1 starts voltage output in accordance with these commands, and current starts flowing through the stator of the induction motor 2. However, since the frequency command $\omega_1^*$ is "0", an output voltage of the power converter 1 is DC voltage and a speed of the induction motor 2 is "0". Therefore, a slip frequency between the stator and rotor of the induction motor 2 is "0" so that the induction motor 2 will not generate torque.

As the mechanical brake operation command is changed from ON to OFF, the mechanical brakes 8 are released so that the vehicle starts to roll back down the sloped road. However, since the voltage applied to the induction motor 2 by the power converter 1 is DC voltage, a positive slip frequency is generated between the stator and rotor of the induction motor 2, and the induction motor 2 starts outputting positive torque. Generally, as the slip frequency becomes higher, the induction motor 2 generates larger torque, and the slip frequency rises until torque generated by the induction motor 2 becomes equal to load torque of the induction motor 2. At this time, the induction motor 2 generates torque sufficient for stopping the vehicle on the sloped road. Strictly speaking, the vehicle rolls back down the sloped road because the induction motor 2 has a negative speed corresponding to the slip frequency. However, since this slip frequency is very low and the induction motor 2 and wheels 4 are coupled by the gears 3, a rotation speed of the wheels 4 is very slow and the vehicle is almost perfectly stopped on the sloped road. Namely, it becomes possible to stop the vehicle almost perfectly on the sloped road by applying DC voltage to the induction motor 2, without necessity of using the mechanical brakes 8.

Next, as the accelerator pedal is depressed, the command calculator 12 changes the current commands $I_d^*$ and $I_q^*$ in accordance with a depression degree of the accelerator pedal and raises the frequency command $\omega_1^*$ from "0" at a predetermined rate. As the frequency command $\omega_1^*$ rises from "0", the frequency of voltage applied to the induction motor 2 rises from "0", the slip frequency between the stator and rotor of the induction motor 2 rises toward a positive direction, and torque generated by the induction motor 2 becomes large. Therefore, as torque generated by the induction motor 2 exceeds the load torque of the induction motor 2, the induction motor 2 is accelerated and the vehicle starts rolling. Namely, since the vehicle starts rolling by increasing torque more than the torque generated by the induction motor 2 during halt of the vehicle, the vehicle will not substantially roll back during hill starting, and the speed of the vehicle increases following a rise in the frequency command $\omega_1^*$.

In order to supply the induction motor 2 with current necessary for outputting torque requested by the driver, the current commands $I_d^*$ and $I_q^*$ are changed. If depression of the accelerator pedal is large, it means that the driver requests large torque so that the current commands $I_d^*$ and $I_q^*$ are made large. Conversely, if depression of the accelerator pedal is small, it means that the driver does not request large torque so that an increment amount of the current commands $I_d^*$ and $I_q^*$ is made small. Generally, such adjustment of the current commands $I_d^*$ and $I_q^*$ is performed in accordance with the accelerator pedal opening degree, because it is necessary to flow large current through the induction motor 2 in order to output large torque. With such adjustment, unnecessarily large current is prevented from flowing through the induction motor 2.

Figure 3A:
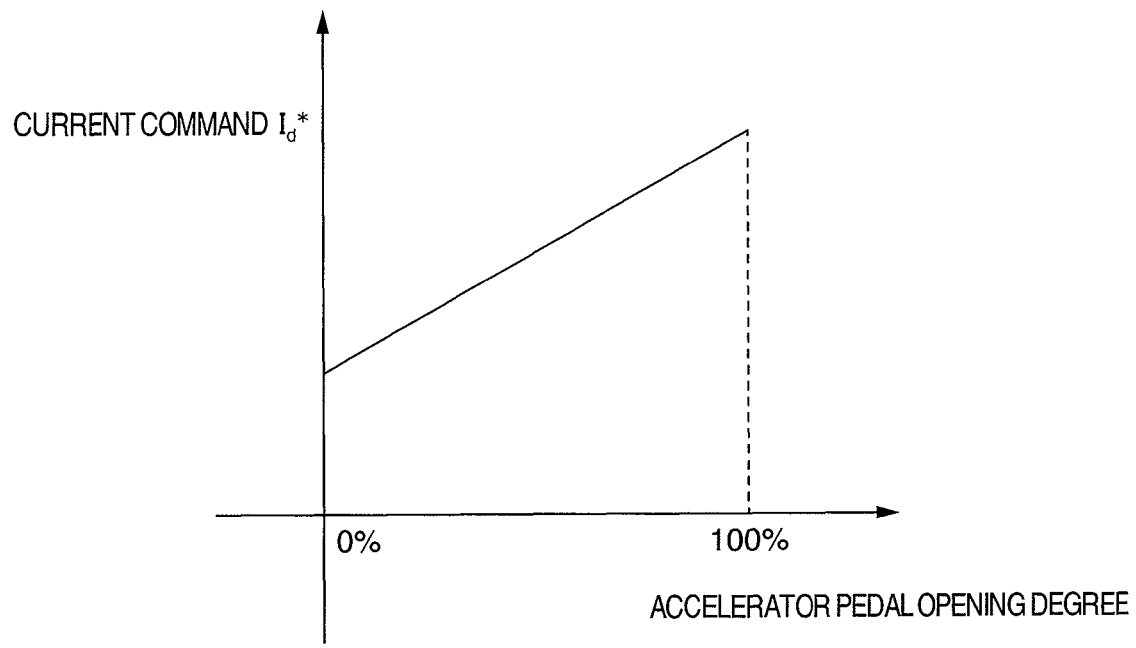
FIGS. 3A and 3B are graphs showing relations between current commands and an accelerator pedal opening degree.
Figure 3B:
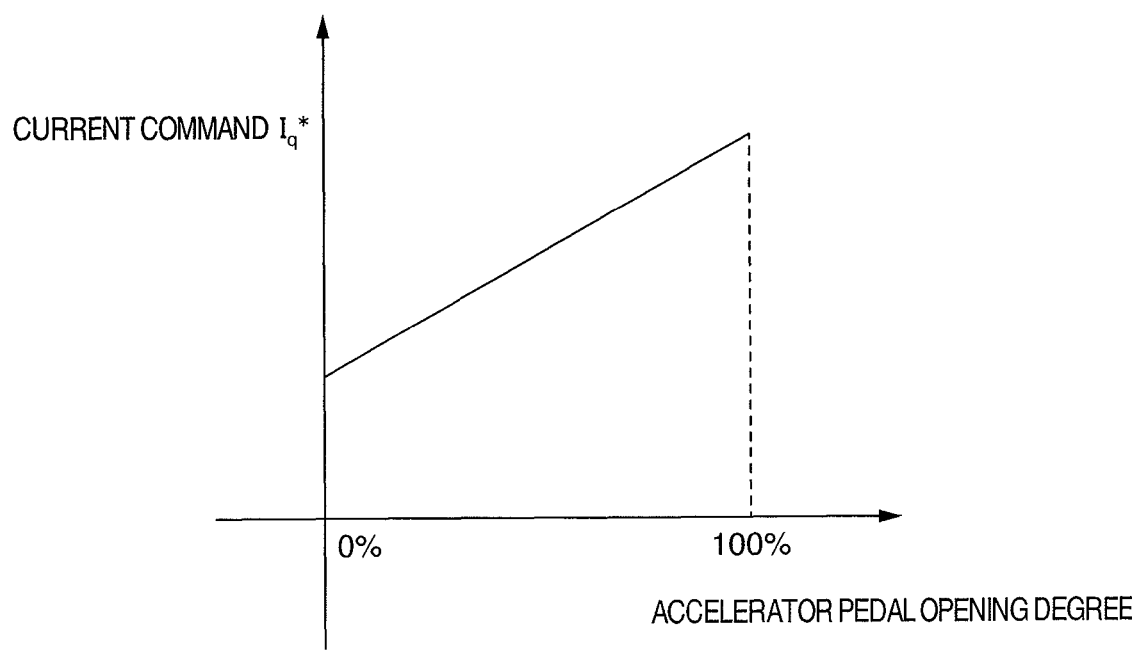

In FIG. 2, although both the current commands $I_d^*$ and $I_q^*$ are made large, both the current commands are not necessarily required to be made large, because it is sufficient in practice if the amplitude of current flowing through the induction motor 2 can be adjusted. Instead, one of the current commands $I_d^*$ and $I_q^*$ may be adjusted. FIGS. 3A and 3B show examples of the relation between the accelerator pedal opening degree and current commands $I_d^*$ and $I_q^*$.

As described above, for stopping, the frequency command $\omega_1^*$ is set to "0" to apply DC voltage to the induction motor 2 and make the induction motor 2 generate torque necessary for stopping the vehicle on the sloped road. For starting, the frequency command $\omega_1^*$ is raised from "0" at a predetermined rate to raise the frequency of voltage applied to the induction motor 2 and further increase torque generated by the induction motor. With these operations, hill starting becomes possible without using the mechanical brakes and rolling backwards. Cooperative control between the mechanical brakes 8 and induction motor 2 is therefore unnecessary and the mechanical brakes 8 will not be subject to abrasion.

Figure 4:
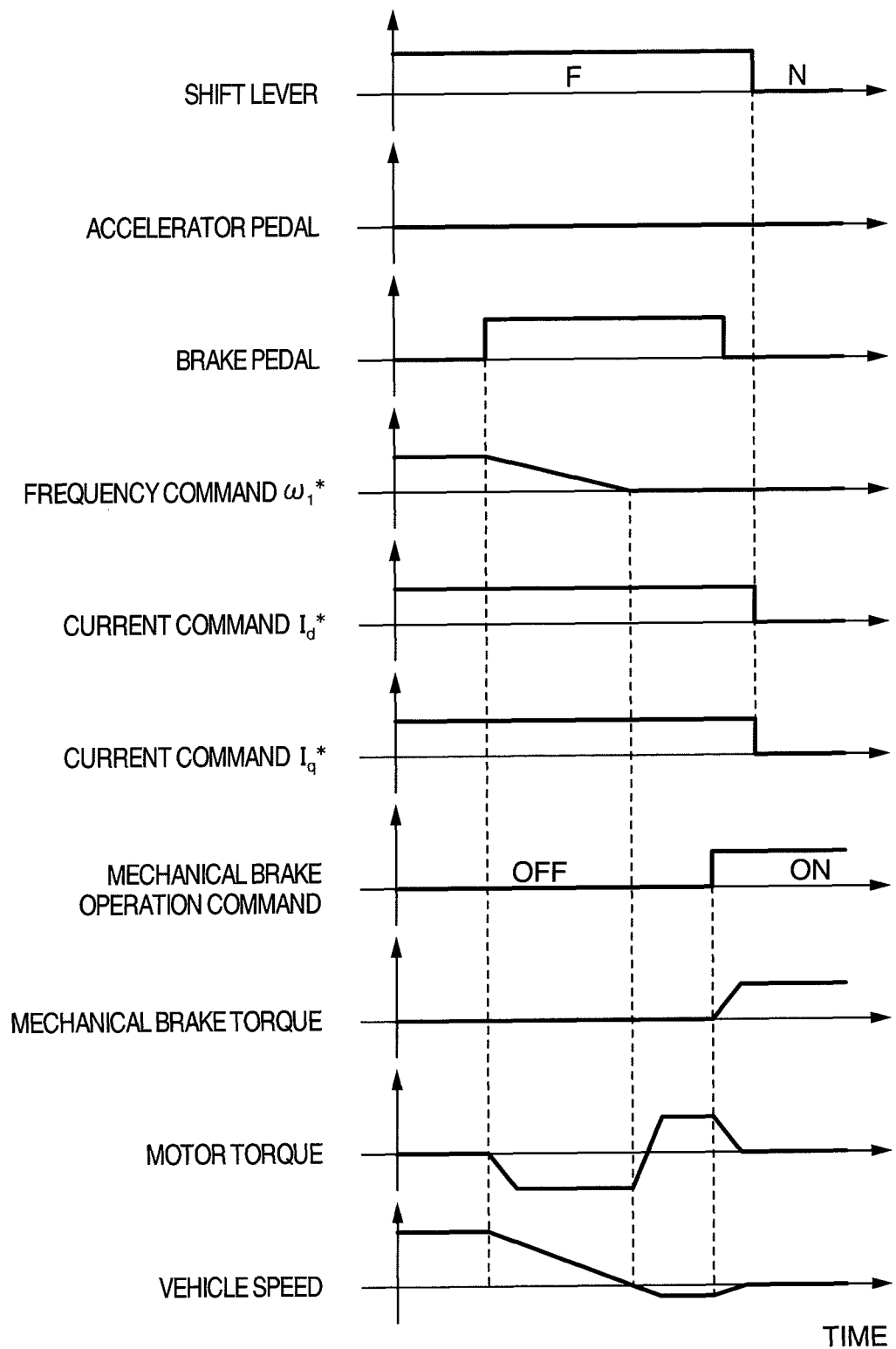
FIG. 4 is a timing chart illustrating an operation of the vehicle of the first embodiment when the vehicle in roll stops.

FIG. 4 is a timing chart illustrating an operation when the vehicle of the embodiment in roll stops. Consider now that the vehicle in inertial roll on a sloped road stops in the state that the accelerator pedal is not depressed and the position of the shift lever is F. Although torque generated by the induction motor 2 is "0" before the brake pedal is depressed, the command calculator 12 lowers the frequency command $\omega_1^*$ toward "0" as the break pedal is depressed. In this case, the frequency of voltage applied to the induction motor 2 lowers, and the slip frequency between the stator and rotor of the induction motor 2 lowers toward the negative direction so that the induction motor 2 outputs negative torque. As a result, the induction motor 2 is decelerated and the speed of the vehicle lowers. Eventually, the speed of the vehicle exceeds "0" and reaches a negative speed to start rolling back down the sloped road. However, since the frequency command $\omega_1^*$ is maintained at "0", DC voltage is applied to the induction motor 2 by the power converter 1 so that a positive slip frequency is generated between the stator and rotor of the induction motor 2 and that the induction motor 2 starts outputting positive torque and eventually outputs torque necessary for stopping the vehicle on the sloped road. Strictly speaking, similar to hill starting, the vehicle rolls back down the sloped road because the induction motor 2 has a negative speed corresponding to the slip frequency. However, this slip frequency is very low and the induction motor 2 and wheels 4 are coupled by the gears 3, a rotation speed of the wheels 4 is very slow and the vehicle is almost perfectly stopped on the sloped road. The mechanical brakes 8 are not therefore required to be used.

Next, as the mechanical brake operation command is changed from OFF to ON, the mechanical brakes 8 operate so that the speed of the induction motor 2 becomes "0" due to torque generated by the mechanical brakes 8 and the slip frequency between the stator and rotor of the induction motor 2 becomes also "0". Therefore, the induction motor 2 does not generate torque. The vehicle does not roll back down the sloped road due to torque generated by the mechanical brakes 8.

Next, as the position of the shift lever is changed from F to N, the command calculator 12 outputs the current commands $I_d^*$ and $I_q^*$ of "0" and the power converter stops voltage output. Therefore, current will not flow through the stator of the induction motor 2.

According to the embodiment, the vehicle can be stopped almost perfectly without using the mechanical brakes 8, independently from the weight of the vehicle and a gradient of the sloped road. Cooperative control between the mechanical brakes 8 and induction motor 2 is not therefore necessary during hill starting and stopping, and the mechanical brakes 8 will not be subject to abrasion. The vehicle will not roll back down the sloped road during hill starting and stopping.

Second Embodiment

Figure 5:
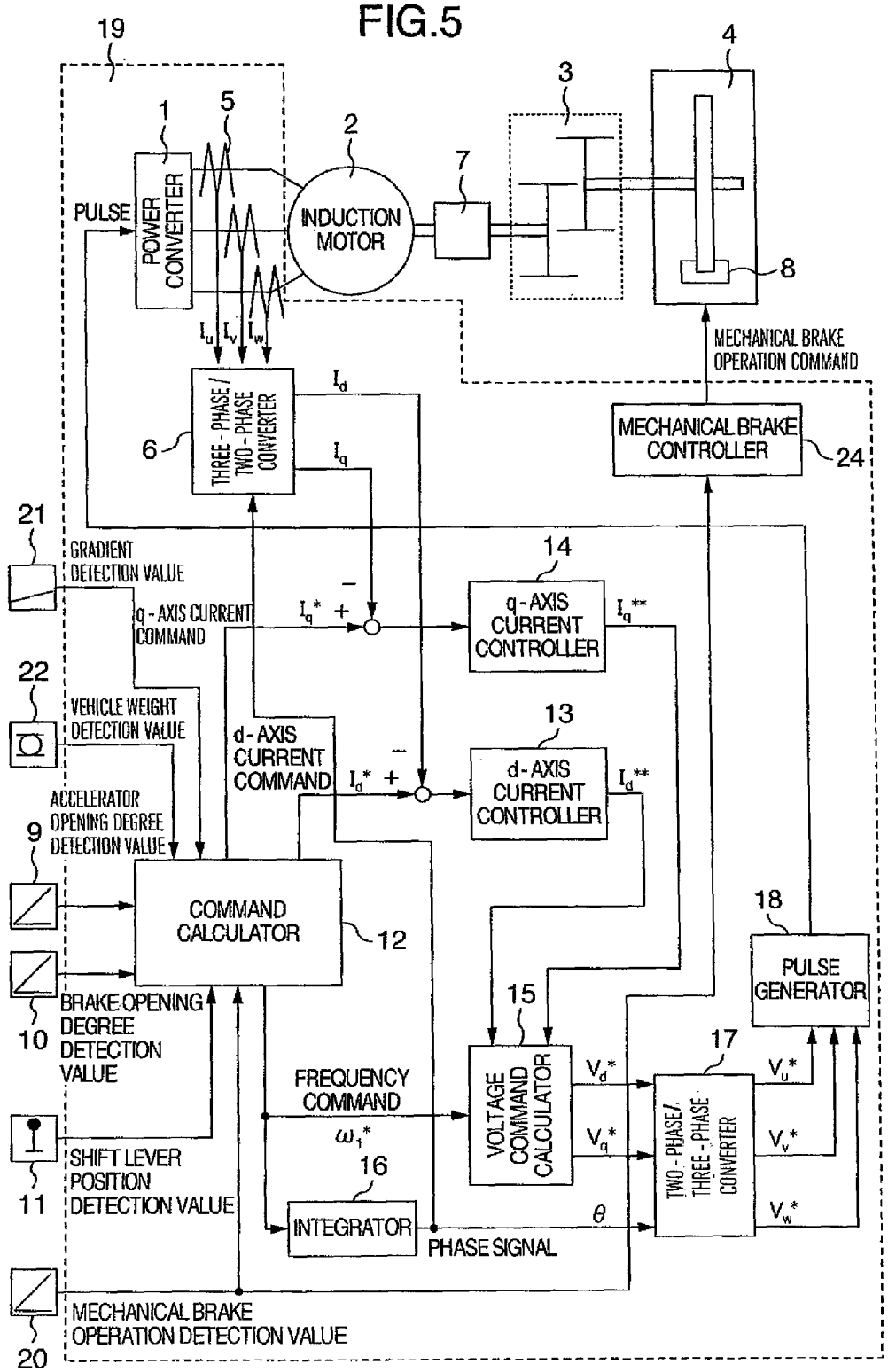
FIG. 5 is an illustrative diagram showing a control system of an electric drive vehicle according to a second embodiment.

FIG. 5 shows the overall structure of the second embodiment. Different points from FIG. 1 reside in that a gradient detector 21 and a vehicle weight detector 22 are equipped and the command calculator 12 is input with a road gradient detection value output from the gradient detector 21 and a vehicle weight detection value output from the vehicle weight detector 22.

Figure 6:
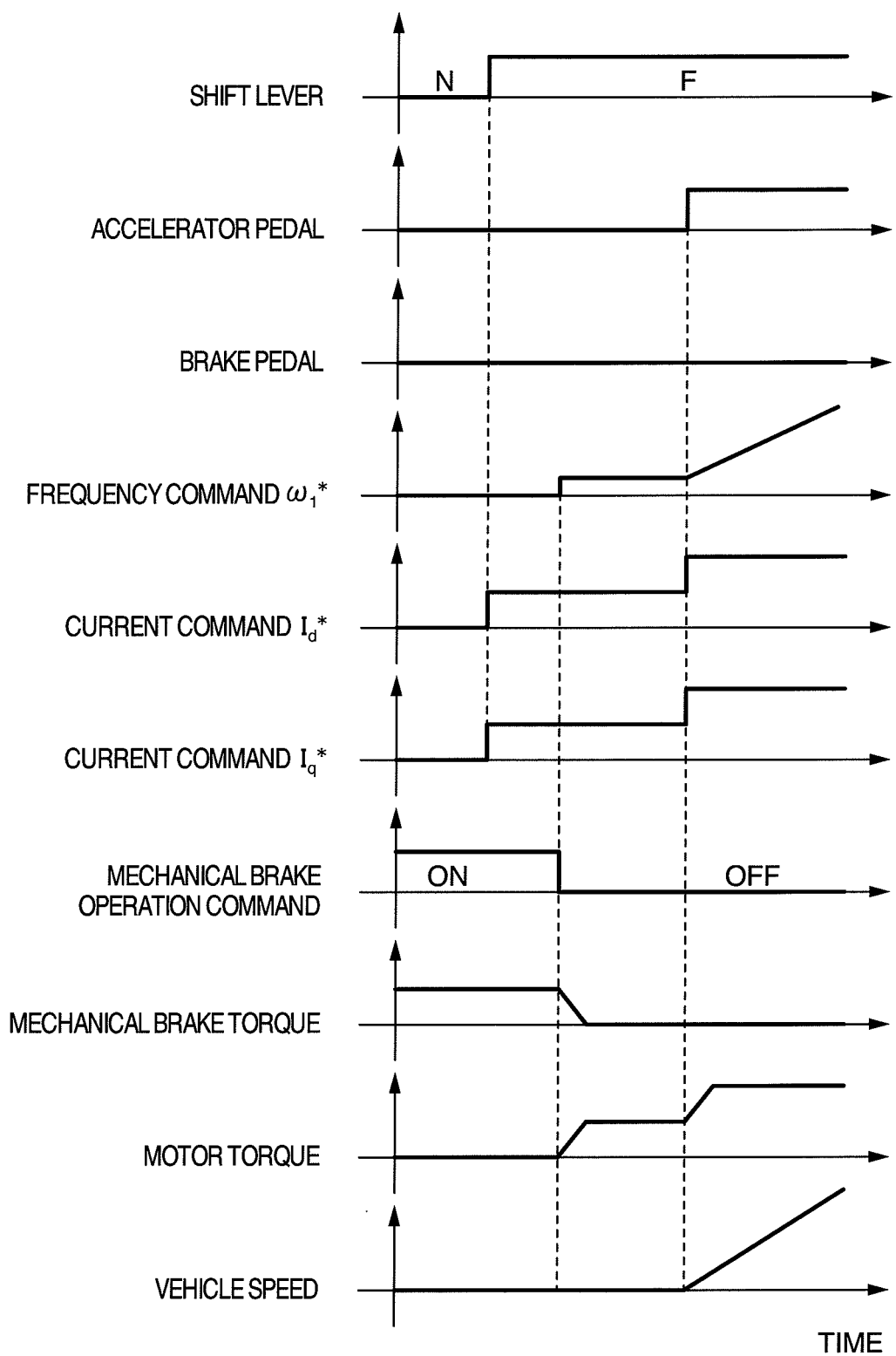
FIG. 6 is a timing chart illustrating an operation of the vehicle of the second embodiment when the vehicle in halt starts.

FIG. 6 is a timing chart illustrating an operation when the vehicle of the embodiment in halt starts. Consider now that the vehicle in halt on a sloped road starts in the state that the mechanical brakes 8 are operating and the position of the shift lever is N. Since the position of the shift lever is N, the power converter 1 stops voltage output, current will not flow through the stator of the induction motor 2, and the induction motor 2 will not generate torque. Therefore, the vehicle does not roll downwards on the sloped road because of torque generated by the mechanical brakes 8.

Next, as the position of the shift lever is changed from N to F, the command calculator 12 outputs predetermined current commands $I_d^*$ and $I_q^*$ and a frequency command $\omega_1^*$ of "0". The power converter 1 starts voltage output in accordance with these commands, and current starts flowing through the stator of the induction motor 2. However, since the frequency command $\omega_1^*$ is "0", an output voltage of the power converter 1 is DC voltage and a speed of the induction motor 2 is "0". Therefore, a slip frequency between the stator and rotor of the induction motor 2 is "0" so that the induction motor 2 will not generate torque.

Next, as the mechanical brake operation command is changed from ON to OFF, the mechanical brakes 8 are released. At this time, the frequency command $\omega_1^*$ is changed to a value calculated from the gradient detection value detected with the gradient detector 21 and the vehicle weight detection value detected with the vehicle weight detector 22. This value corresponds to a slip frequency at which the induction motor 2 can output torque necessary for stopping the vehicle on the sloped road. Therefore, voltage output from the power converter 1 is AC voltage having a frequency equal to the slip frequency. The induction motor 2 maintains a speed of "0" while outputting torque necessary for stopping the vehicle on the sloped road. The vehicle is therefore stopped perfectly. Namely, by applying to the induction motor 2 AC voltage having a frequency equal to the slip frequency at which the induction motor can output torque necessary for stopping the vehicle on the sloped road, the vehicle can be stopped perfectly on the sloped road without using the mechanical brakes 8.

Next, as the accelerator pedal is depressed, the command calculator 12 changes the current commands $I_d^*$ and $I_q^*$ in accordance with a depression degree of the accelerator pedal and raises the frequency command $\omega_1^*$ from a presently output value at a predetermined rate. As the frequency command $\omega_1^*$ rises, the frequency of voltage applied to the induction motor 2 increases, the slip frequency between the stator and rotor of the induction motor 2 increases toward a positive direction, and torque generated by the induction motor 2 becomes large. Therefore, as torque generated by the induction motor 2 exceeds the load torque of the induction motor 2, the induction motor 2 is accelerated and the vehicle starts rolling. Namely, since the vehicle starts rolling by increasing torque more than the torque generated by the induction motor 2 during halt of the vehicle, the vehicle will not substantially roll backwards during hill starting, and the speed of the vehicle increases following a rise in the frequency command $\omega_1^*$.

As described above, for stopping, the frequency command $\omega_1^*$ is set to a slip frequency at which the induction motor 2 can output torque necessary for stopping the vehicle on the sloped road, and AC voltage having a frequency equal to the slip frequency is applied to the induction motor 2 to thereby make the induction motor 2 generate the torque necessary for stopping the vehicle on the sloped road. For starting, the frequency command $\omega_1^*$ is raised from a presently output value at a predetermined rate to raise the frequency of voltage applied to the induction motor 2 and further increase torque generated by the induction motor 2. With these operations, hill starting becomes possible without using the mechanical breaks 8 and rolling backwards. As to cooperative control between the mechanical brakes 8 and induction motor 2, the frequency command $\omega_1^*$ is changed when the mechanical brakes 8 are released. However, this cooperative control is easy and the mechanical brakes 8 will not be subject to abrasion.

Figure 7:
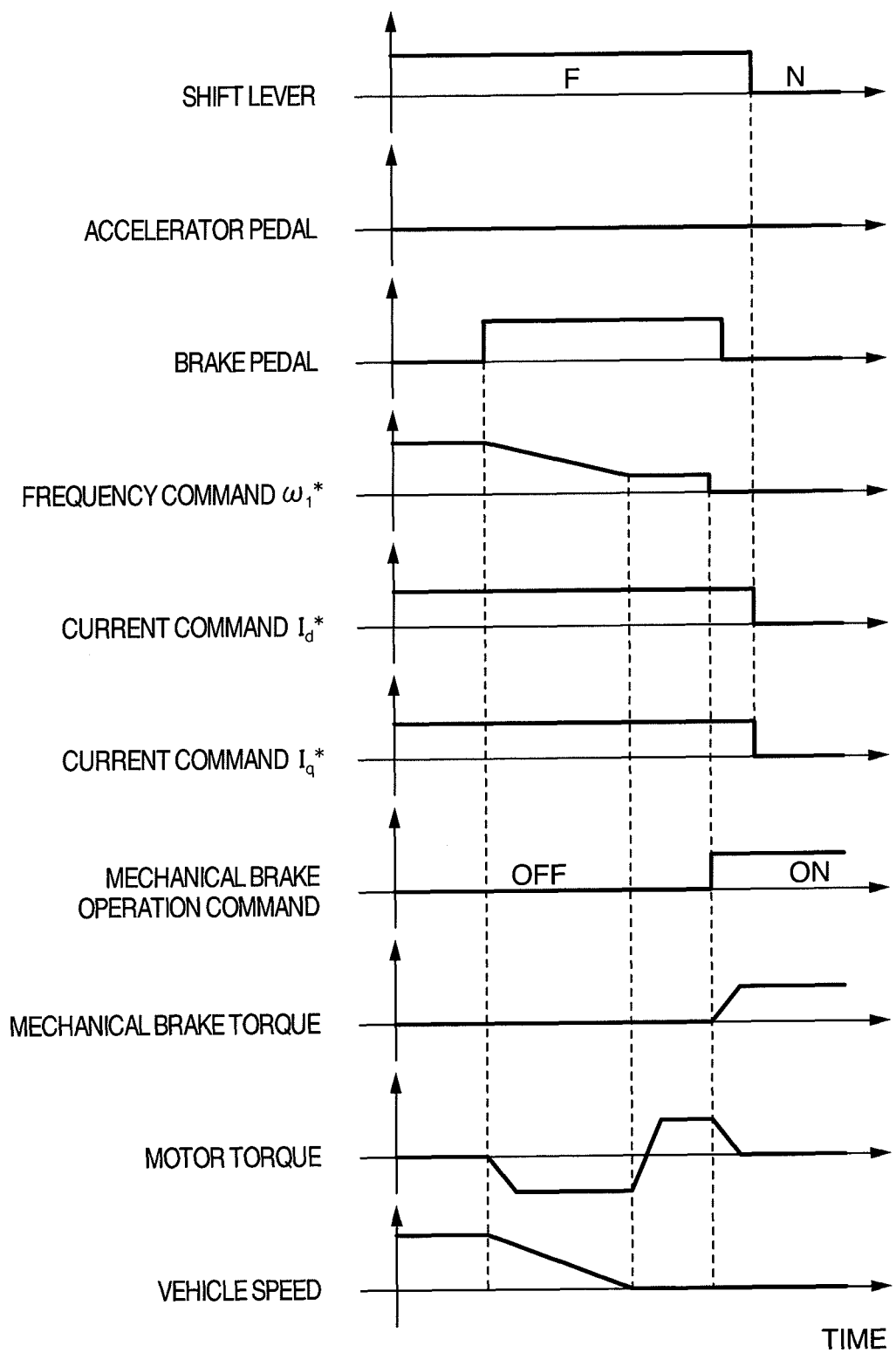
FIG. 7 is a timing chart illustrating an operation of the vehicle of the second embodiment when the vehicle in roll stops.

FIG. 7 is a timing chart illustrating an operation when the vehicle of the embodiment in roll stops. Consider now that the vehicle in inertial roll on a sloped road stops in the state that the accelerator pedal is not depressed and the position of the shift lever is F. Although torque generated by the induction motor 2 is "0" before the brake pedal is depressed, as the break pedal is depressed, the command calculator 12 lowers the frequency command $\omega_1^*$ toward a value calculated from the gradient detection value detected with the slope detector 21 and the vehicle weight detection value detected with the vehicle weight detector 22. A target value of the frequency command $\omega_1^*$ corresponds to a slip frequency at which the induction motor 2 can output torque necessary for stopping the vehicle on the sloped road. In this case, the frequency of voltage applied to the induction motor 2 lowers, and the slip frequency between the stator and rotor of the induction motor 2 lowers toward the negative direction so that the induction motor 2 outputs negative torque. As a result, the induction motor 2 is decelerated and the speed of the vehicle lowers. As the frequency command $\omega_1^*$ lowers to the slip frequency at which the induction motor 2 can output torque necessary for stopping the vehicle on the sloped road, the frequency command $\omega_1^*$ is maintained. Therefore, as the speed of the vehicle lowers, a positive slip frequency is generated between the stator and rotor of the induction motor 2 so that the induction motor 2 starts generating positive torque and eventually outputs torque necessary for stopping the vehicle on the sloped road. It is therefore unnecessary to use the mechanical brakes 8.

Next, as the mechanical brake operation command is changed from OFF to ON, the mechanical brakes 8 operate and the frequency command $\omega_1^*$ is set to "0". Therefore, the slip frequency between the stator and rotor of the induction motor 2 becomes "0" and the induction motor 2 will not generate torque. The vehicle does not roll back down the sloped road because of torque generated by the mechanical brakes 8.

Next, as the position of the shift lever is changed from F to N, the command calculator 12 outputs the current commands $I_d^*$ and $I_q^*$ of "0" and the power converter 1 stops voltage output. Therefore, current will not flow through the stator of the induction motor 2.

In the above description, although an uphill road has been assumed, the embodiments are applicable also to a flat road and a downhill road. On the uphill road, torque necessary for stopping the vehicle is positive and the slip frequency at which the induction motor 2 can output the torque is also positive. On a flat road, torque and a slip frequency are "0", and on a downhill road, torque and a slip frequency are negative. The range of a slip frequency is about −1 Hz to +1 Hz although it changes depending upon the type of the induction motor 2. It is not preferable that the slip frequency becomes out of this range, because a load on the induction motor 2 increases. Although the slip frequency at which the induction motor 2 can output torque necessary for stopping the vehicle on a road can be calculated from the gradient detection value detected with the slop detector 21 and the vehicle weight detection value detected with the vehicle weight detector 22, the invention is not limited only to this calculation method.

According to the embodiment, the vehicle can be stopped perfectly without using the mechanical brakes 8 by adjusting the frequency command $\omega_1^*$ during halt, in accordance with from the weight of the vehicle and a gradient of the sloped road. Cooperative control between the mechanical brakes 8 and induction motor 2 during hill starting and stopping is easy, and abrasion of the mechanical breaks 8 does not occur. The vehicle will not roll back down the sloped road during hill starting and stopping.

Third Embodiment

Figure 8:
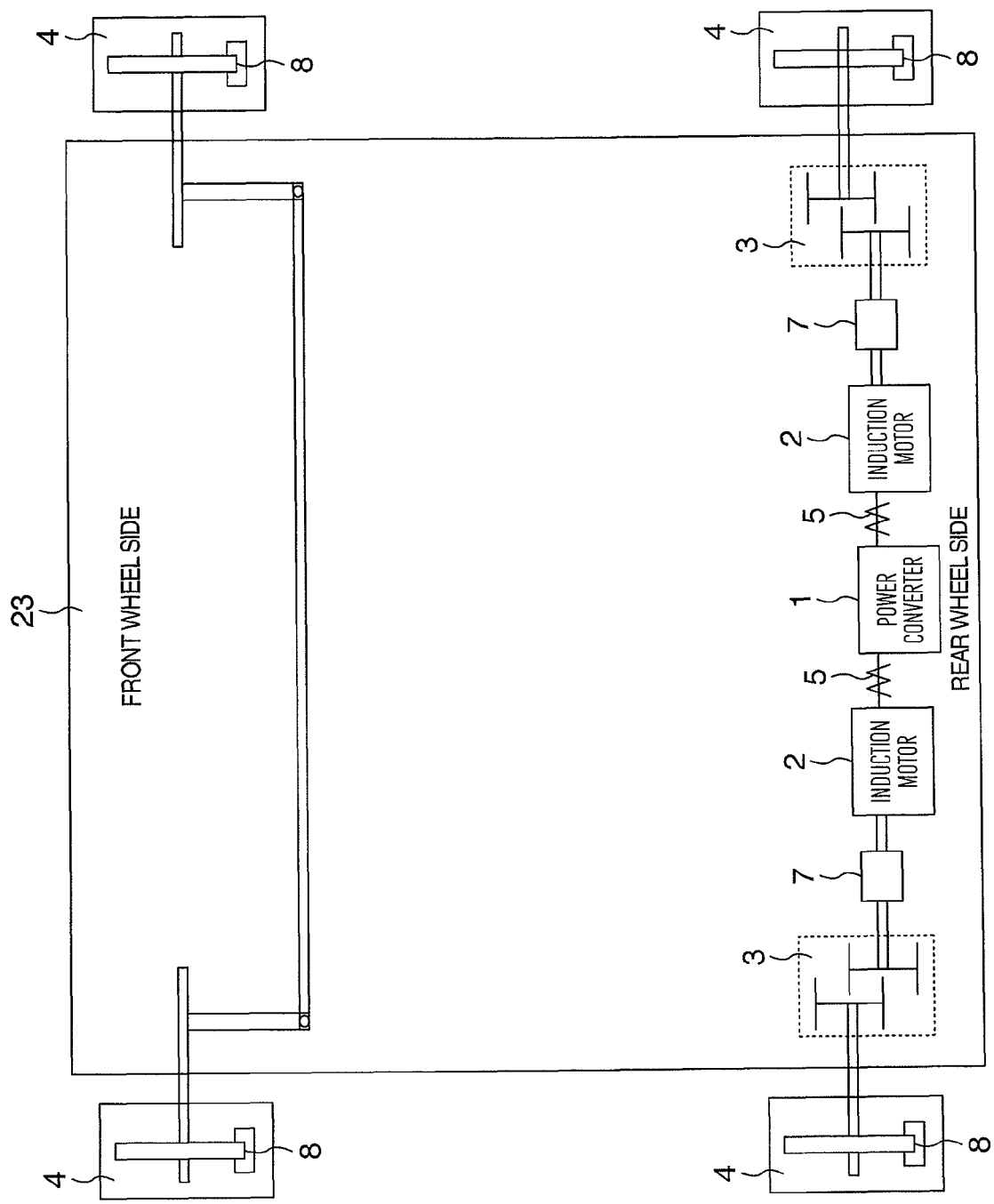
FIG. 8 is an illustrative diagram showing the structure of an electric drive vehicle according to a third embodiment.

FIG. 8 shows the overall structure of a vehicle adopted in the first and second embodiments. In FIG. 8, a rear wheel side shows driving wheels, and a front wheel side shows coupled driving wheels. As shown in FIG. 8, a power converter 1 drives right and left induction motors 2 on the rear wheel side of a vehicle chassis 23 so that the vehicle can roll forwards and backwards. Right and left induction motors 2 can be controlled independently, and it is possible to determine right and left distributions of driving force or braking force to be generated by the vehicle, in accordance with handling by a driver. All wheels 4 are equipped with a mechanical brake 8, and controlled at the same time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. An electric drive vehicle comprising:
an induction motor for braking or driving wheels;
a power converter for driving the induction motor;
a motor controller for controlling the power converter to control the induction motor;
mechanical brakes for braking the wheels;
an acceleration pedal for the vehicle; and
a shift lever for determining a traveling direction of the vehicle;

wherein the power converter outputs a voltage corresponding to a current command from the motor controller, and while the shift lever is at a forward (F) position and the accelerator pedal is not depressed, the motor controller gives a constant current command and a frequency command to make the frequency of electric power for driving the induction motor zero to the power converter so that the power converter outputs a DC voltage based on the current and frequency commands wherein constant current flows through the stator of the induction motor to make the induction motor generate torque for stopping the vehicle and maintain the vehicle in a halt state, and wherein under conditions in which the shift lever is at a forward position, the accelerator pedal is not depressed and the mechanical brakes are released, the motor controller generates a command signal including a current command and a zero frequency command and the command signal is supplied to the power converter and, based on the command signal, the power converter controls the induction motor, so that the stator current of the induction motor is maintained in a constant DC current value and an output torque of the induction motor varies depending on a slip frequency of the induction motor.

2. The electric drive vehicle according to claim 1, wherein the mechanical brakes are not operating while the vehicle is maintained in the halt state by the torque generated by the induction motor.

3. The electric drive vehicle according to claim 1, wherein when the vehicle starts, the motor controller, through the power converter, applies a voltage to the induction motor and adjusts magnitude of said voltage to supply the stator of said induction motor with a predetermined magnitude of a current so that a frequency of the voltage applied to the stator of the induction motor is raised at a predetermined rate.

4. The electric drive vehicle according to claim 1, wherein when the vehicle in roll stops, the motor controller, through the power converter, applies a voltage to the induction motor and adjusts magnitude of said voltage to supply the stator of said induction motor with a predetermined magnitude of a current so that a frequency of the voltage applied to the stator of the induction motor is lowered at a predetermined rate.

5. The electric drive vehicle according to claim 1, wherein the motor controller is equipped with a current controller, and a current command supplied to the current controller changes with an opening degree of the accelerator pedal so that as the opening degree of said accelerator pedal is increased the current command is increased.

6. An electric drive vehicle comprising:
an induction motor for braking or driving wheels;
a power converter for driving the induction motor;
a motor controller for controlling the power converter to control the induction motor;
mechanical brakes for braking the wheels;
an accelerator pedal for the vehicle; and
a shift lever for determining a traveling direction of the vehicle,
wherein the power converter outputs a voltage corresponding to a current command from the motor controller, and while the shift lever is at forward (F) position and the accelerator pedal is not depressed the motor controller gives a frequency command to make the frequency of electric power for driving the induction motor zero to the power converter so that the power converter outputs a DC voltage based on the current and frequency commands wherein constant current flows through the stator of the induction motor to make the induction motor generate torque for stopping the vehicle and maintain the vehicle in a halt state;

wherein under conditions in which the shift lever is at a forward position, the accelerator pedal is not depressed and the mechanical brakes are released, the motor controller generates a command signal including a current command and a zero frequency command and the command signal is supplied to the power converter and, based on the command signal, the power converter controls the induction motor, so that the stator current of the induction motor is maintained in a constant DC current value and an output torque of the induction motor varies depending on a slip frequency of the induction motor, and wherein when the vehicle starts from a state in which the vehicle is in halt on a sloped road while the mechanical brakes are operating, said shift lever is set at a position for driving the vehicle forward or backward, said motor controller starts output of a voltage to said induction motor, and upon depression of the acceleration pedal, following the release of the mechanical brakes, a frequency of the voltage is raised from zero to start the vehicle.

7. The electric drive vehicle according to claim 1, further comprising a current command portion that outputs a current command to apply a constant current value to the stator of said induction motor.

8. An electric vehicle comprising:
an induction motor for braking or driving wheels;
a power converter for driving the induction motor;
a controller for controlling the power converter in accordance with a current command value and a frequency command value; and
mechanical brakes for braking the wheels,
wherein before the mechanical brakes are shifted into a release state and during a period from when a shift lever is shifted into a driving state to when an acceleration required by an accelerator occurs, the controller sets the current command value to a predetermined value and the frequency command value to zero value to apply a DC voltage to the induction motor wherein constant current flows through the stator so that the induction motor generates a torque, which is reflective of slip frequency generated between the stator and rotor of the induction motor, for halting a vehicle,
wherein under conditions in which the shift lever is at a forward position, the accelerator pedal is not depressed and the mechanical brakes are released, the motor controller generates a command signal including a current command and a zero frequency command and the command signal is supplied to the power converter and, based on the command signal, the power converter controls the induction motor, so that the stator current of the induction motor is maintained in a constant DC current value and an output torque of the induction motor varies depending on a slip frequency of the induction motor, and wherein after the acceleration required by the accelerator occurs, the controller increases the current command value and gradually the frequency of the frequency command value with time to apply an AC voltage to the stator of the induction motor so that the induction motor generates a torque for accelerating the vehicle.

9. Method of operating an electric vehicle including an induction motor for braking or driving wheels, a power converter for driving the induction motor, a motor controller for controlling the power converter to control the induction motor, mechanical brakes for braking the wheels, an accelerator pedal for the vehicle, and a shift lever for determining a traveling direction of the vehicle, the method comprising:

enabling the power converter to output a voltage corresponding to a current command from the motor controller, and while the shift lever is at a forward (F) position and the accelerator pedal is not depressed, the motor controller gives a constant current command and a frequency command to make the frequency of electric power for driving the induction motor zero to the power converter so that the power converter outputs a DC voltage based on the current and frequency commands wherein constant current flows through the stator of the induction motor to make the induction motor generate torque for stopping the vehicle and maintain the vehicle in a halt state, and wherein under conditions in which the shift lever is at a forward position, the accelerator pedal is not depressed and the mechanical brakes are released, the motor controller generates a command signal including a current command and a zero frequency command and the command signal is supplied to the power converter and, based on the command signal, the converter controls the induction motor, so that the stator current of the induction motor is maintained in a constant DC current value and an output torque of the induction motor varies depending on a slip frequency of the induction motor.

10. The method of operating an electric vehicle according to claim 9, wherein the mechanical brakes are not operating while the vehicle is maintained in the halt state by the torque generated by the induction motor.

11. The method of operating an electric vehicle according to claim 9, wherein when the vehicle starts, the motor controller, through the power converter, applies a voltage to the induction motor and adjusts magnitude of said voltage to supply the stator of said induction motor with a predetermined magnitude of a current so that a frequency of the voltage applied to the stator of the induction motor is raised at a predetermined rate.

12. The method of operating an electric vehicle according to claim 9, wherein when the vehicle in roll stops, the motor controller, through the power converter, applies a voltage to the induction motor and adjusts magnitude of said voltage to supply the stator of said induction motor with a predetermined magnitude of a current so that a frequency of the voltage applied to the stator of the induction motor is lowered at a predetermined rate.

13. The method of operating an electric vehicle according to claim 9, wherein the motor controller is equipped with a current controller, and a current command supplied to the current controller changes with an opening degree of the accelerator pedal so that as the opening degree of said accelerator pedal is increased the current command is increased.

14. Method of operating an electric vehicle including an induction motor for braking or driving wheels, a power converter for driving the induction motor, a controller for controlling the power converter in accordance with a current command value and a frequency command value, and mechanical brakes for braking the wheels, the method comprising:

before the mechanical brakes are shifted into a release state and during a period from when a shift lever is shifted into a driving state to when an acceleration required by an accelerator occurs, the controller sets the current command value to a predetermined value and the frequency command value to zero value to apply a DC voltage to the induction motor wherein constant current flows through the stator so that the induction motor generates a torque, which is reflective of slip frequency generated between the stator and rotor of the induction motor, for halting a vehicle, under conditions in which the shift lever is at a forward position, the accelerator pedal is not depressed and the mechanical brakes are released, the motor controller generates a command signal including a current command and a zero frequency command and the command signal is supplied to the power converter and, based on the command signal, the power converter controls the induction motor, so that the stator current of the induction motor is maintained in a constant DC current value and an output torque of the induction motor varies depending on a slip frequency of the induction motor, and after the acceleration required by the accelerator occurs, the controller increases the current command value and gradually the frequency of the frequency command value with time to apply an AC voltage to the stator of the induction motor so that the induction motor generates a torque for accelerating the vehicle.

* * * * *